(12) United States Patent
Horiguchi

(10) Patent No.: US 10,666,815 B2
(45) Date of Patent: May 26, 2020

(54) IMAGE READING DEVICE, IMAGE FORMING APPARATUS THEREWITH, AND IMAGE READING METHOD

(71) Applicant: KYOCERA Document Solutions Inc., Osaka (JP)

(72) Inventor: Yasuyuki Horiguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/189,594

(22) Filed: Nov. 13, 2018

(65) Prior Publication Data

US 2019/0166261 A1 May 30, 2019

(30) Foreign Application Priority Data

Nov. 27, 2017 (JP) .................................. 2017-226652

(51) Int. Cl.
*G06F 15/00* (2006.01)
*H04N 1/00* (2006.01)

(52) U.S. Cl.
CPC ....... *H04N 1/00082* (2013.01); *H04N 1/0057* (2013.01); *H04N 1/00167* (2013.01); *H04N 1/00785* (2013.01)

(58) Field of Classification Search
CPC ........... H04N 1/00082; H04N 1/00167; H04N 1/0057; H04N 1/00785

USPC ........................................................ 358/474
See application file for complete search history.

(56) References Cited

U.S. PATENT DOCUMENTS

| | | | |
|---|---|---|---|
| 2003/0048491 A1* | 3/2003 | Fukuzawa ............ | H04N 1/0464 358/474 |
| 2017/0034387 A1* | 2/2017 | Horiguchi ............. | H04N 1/203 |
| 2017/0111549 A1* | 4/2017 | Miyazaki ............. | H04N 1/0313 |

FOREIGN PATENT DOCUMENTS

JP        2002-44438 A        2/2002

\* cited by examiner

*Primary Examiner* — Mark R Milia
(74) *Attorney, Agent, or Firm* — Stein IP, LLC

(57) ABSTRACT

An image reading device can perform fixed-reading processing where image data is read by a fixed-document method and conveyed-reading processing where image data is read by a sheet-through method while a reading module is kept staying at any of a plurality of image reading positions including a reference reading position. A control portion, when a reference second adjustment value for the reference reading position used for shading correction in the conveyed-reading processing is acquired, calculates a second adjustment values for a plurality of image reading positions based on the reference second adjustment value, and when the reference second adjustment value is not acquired and a first adjustment value used for shading correction in the fixed-reading processing is acquired, calculates the second adjustment values for the plurality of image reading positions based on the first adjustment value.

7 Claims, 6 Drawing Sheets

IMAGE READING DEVICE, IMAGE FORMING APPARATUS THEREWITH, AND IMAGE READING METHOD

INCORPORATION BY REFERENCE

This application is based upon and claims the benefit of priority from the corresponding Japanese Patent Application No. 2017-226652 filed on Nov. 27, 2017, the entire contents of which are incorporated herein by reference.

BACKGROUND

The present disclosure relates to an image reading device that is used in digital copiers, image scanners, and the like to scan and read a document, to an image forming apparatus provided with one, and to an image reading method.

Some conventional image reading devices incorporated in multifunction peripherals and the like using an electrophotographic process include a document conveying device (automatic document feeder) that sends a document in sheet form to a document stage (contact glass) to read it, and discharges it from the document stage after reading it. Such an image reading device allows two kinds of reading methods, namely, a sheet-through method in which, while a reading module is fixed at an image reading position, the document conveying device automatically conveys and reads a document, and a fixed-document method in which, while the document on the document stage is replaced one by one with a document presser opened and closed every time a document is read, the reading module is moved to scan and read the document placed on the document stage.

In the image reading devices described above, density difference may arise between the image data read by the fixed-document method and that read by the sheet-through method. For example, when image data is read by the fixed-document method, a document is pressed by a cover member against the contact glass to make close contact with the contact glass. On the other hand, when image data is read by the sheet-through method, a document may be conveyed while being away from the contact glass at the image reading position.

In that case, the distance between a document and the contact glass when image data is read by the fixed-document method is different from that when image data is read by the sheet-through method. Thus, the density of the image data read from a document by the sheet-through method is higher (darker) than that of the image data read from a document by the fixed-document method.

To cope with that, in one known image reading device, by performing shading correction using an adjustment value previously acquired for each of a plurality of reading methods, the difference in the image density in image data caused by the difference in the reading method can be reduced. Specifically, based on image data read from a prescribed reference density document by each reading method, adjustment values for the different reading methods are acquired respectively.

SUMMARY

According to one aspect of the present disclosure, an image reading device includes a contact glass, a document conveying device, a reading module, and a control portion. The contact glass is fixed on the top face of a scanner frame and is partitioned into a manual placement document glass and an automatic reading glass. The document conveying device is openably and closably supported in an up-down direction with respect to the contact glass and conveys a document to the top face of the automatic reading glass. The reading module is arranged below the contact glass so as to be reciprocatable in the sub scanning direction and is configured to read image data of a document by a fixed-document method where an image of the document placed on the manual placement document glass is read while the reading module moves in the sub scanning direction and by a sheet-through method where the image of the document conveyed on the top face of the automatic reading glass by the document conveying device is read while the reading module stays at an image reading position facing the automatic reading glass. The control portion controls reading operation by the reading module. The control portion includes a reading processing portion, a correction processing portion, and a setting processing portion. The reading processing portion is configured to perform fixed-reading processing where image data is read by the fixed-document method using the reading module and conveyed-reading processing where image data is read by the sheet-through method using the reading module. The correction processing portion performs shading correction using a first adjustment value on image data read through fixed-reading processing and performs shading correction using a second adjustment value on image data read through conveyed-reading processing. The setting processing portion acquires the first adjustment value based on data of a reference image acquired through fixed-reading processing and acquires the second adjustment value based on data of the reference image acquired through conveyed-reading processing in the reading processing portion. Conveyed-reading processing can be performed while the reading module is kept staying at any of a plurality of the image reading positions including a reference reading position. The setting processing portion, when a reference second adjustment value which is the second adjustment value at the reference reading position is acquired, calculates the second adjustment values for the plurality of image reading positions based on the reference second adjustment value, and when the reference second adjustment value is not acquired and the first adjustment value is acquired, calculates the second adjustment values for the plurality of image reading positions based on the first adjustment value.

This and other objects of the present disclosure, and the specific benefits obtained according to the present disclosure, will become apparent from the description of embodiments which follows.

DETAILED DESCRIPTION

Figure 1:
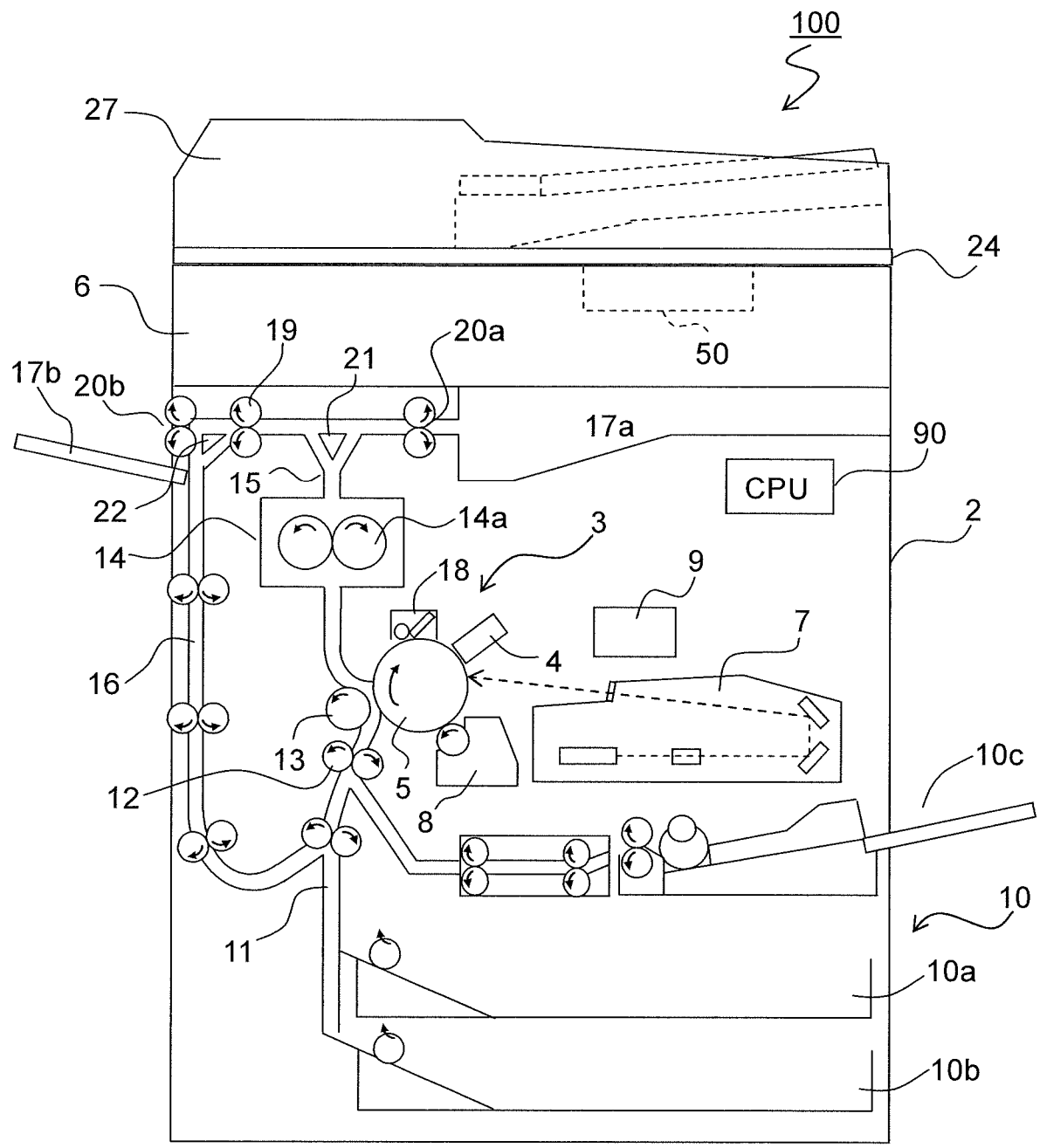
FIG. 1 is a side cross-sectional view showing an overall construction of an image forming apparatus provided with an image reading portion according to the present disclosure.

Hereinafter, with reference to the accompanying drawings, embodiments of the present disclosure will be described. FIG. 1 is a schematic configuration diagram of an image forming apparatus 100 provided with an image reading portion 6 of the present disclosure. The image forming apparatus 100 in FIG. 1 (here, a digital multifunction peripheral is shown as an example), when performing copy operation, converts image data of a document into a read image signal in the image reading portion 6, which will be described later. On the other hand, in an image forming portion 3 in the main body of the multifunction peripheral 2, a photosensitive drum 5 rotating in the clockwise direction in FIG. 1 is electrostatically charged uniformly by an electrical charging unit 4. Then, with a laser beam from an exposure unit (for example, a laser scanning unit) 7, an electrostatic latent image based on document image data that has been read in the image reading portion 6 is formed on the photosensitive drum 5. Developer (hereinafter called toner) is attached to the formed electrostatic latent image by a developing unit 8 to form a toner image. Toner is fed to the developing unit 8 from a toner container 9.

Toward the photosensitive drum 5, where a toner image has now been formed as described above, a sheet is conveyed to the image forming portion 3 from a sheet feeding mechanism 10 through a sheet conveying passage 11 via a registration roller pair 12. The conveyed sheet passes through a nip portion between the photosensitive drum 5 and a transfer roller 13 (an image transfer portion), and thereby the toner image on the surface of the photosensitive drum 5 is transferred to the sheet. The sheet on which the toner image has been transferred is separated from the photosensitive drum 5, and is conveyed to a fixing portion 14 that has a fixing roller pair 14a, where the toner image is fixed on the sheet. The sheet that has passed the fixing portion 14 is conveyed to a sheet conveying passage 15 that branches into a plurality of directions. The sheet has its conveying direction switched by path switching mechanisms 21 and 22 that have a plurality of path switching guides provided at branch points along the sheet conveying passage 15, and is then (or after being conveyed to a reversing conveying passage 16 and having undergone two-sided copying) discharged to a sheet discharge portion comprising a first discharge tray 17a and a second discharge tray 17b.

A static eliminator (unillustrated) that removes residual electric charges on the surface of the photosensitive drum 5 is provided on the downstream side of a cleaning device 18 in the rotating direction of the photosensitive drum 5. The sheet feeding mechanism 10 is removably fitted to the main body of the multifunction peripheral 2, and includes a plurality of sheet feeding cassettes 10a and 10b for storing sheets and a stack bypass (manual feed tray) 10c provided over them. These are connected, through the sheet conveying passage 11, to the image forming portion 3 formed by the photosensitive drum 5, the developing unit 8, and the like.

In an upper part of the main body of the multifunction peripheral 2, the image reading portion 6 is arranged, and on the top face of the multifunction peripheral 2, a platen (document presser) 24 is openably/closably arranged. The platen 24 presses and holds a document placed on a contact glass 25 (see FIG. 2) of the image reading portion 6. On the platen 24, a document conveying device 27 is provided.

The sheet conveying passage 15, specifically, first branches into two, left and right, paths on the downstream side of the fixing roller pair 14a, and one path (the path extending rightward in FIG. 1) communicates with a first discharge tray 17a. The other path (the path extending leftward in FIG. 1), via a conveying roller pair 19, then branches into two paths, and one path (the path extending leftward in FIG. 1) communicates with the second discharge tray 17b. The other path (the path extending downward in FIG. 1) communicates with a reversing conveying passage 16.

In the main body of the multifunction peripheral 2, there is arranged a control portion (CPU) 90 that controls the operation of the image forming portion 3, the image reading portion 6, the document conveying device 27, and the like.

Figure 2:
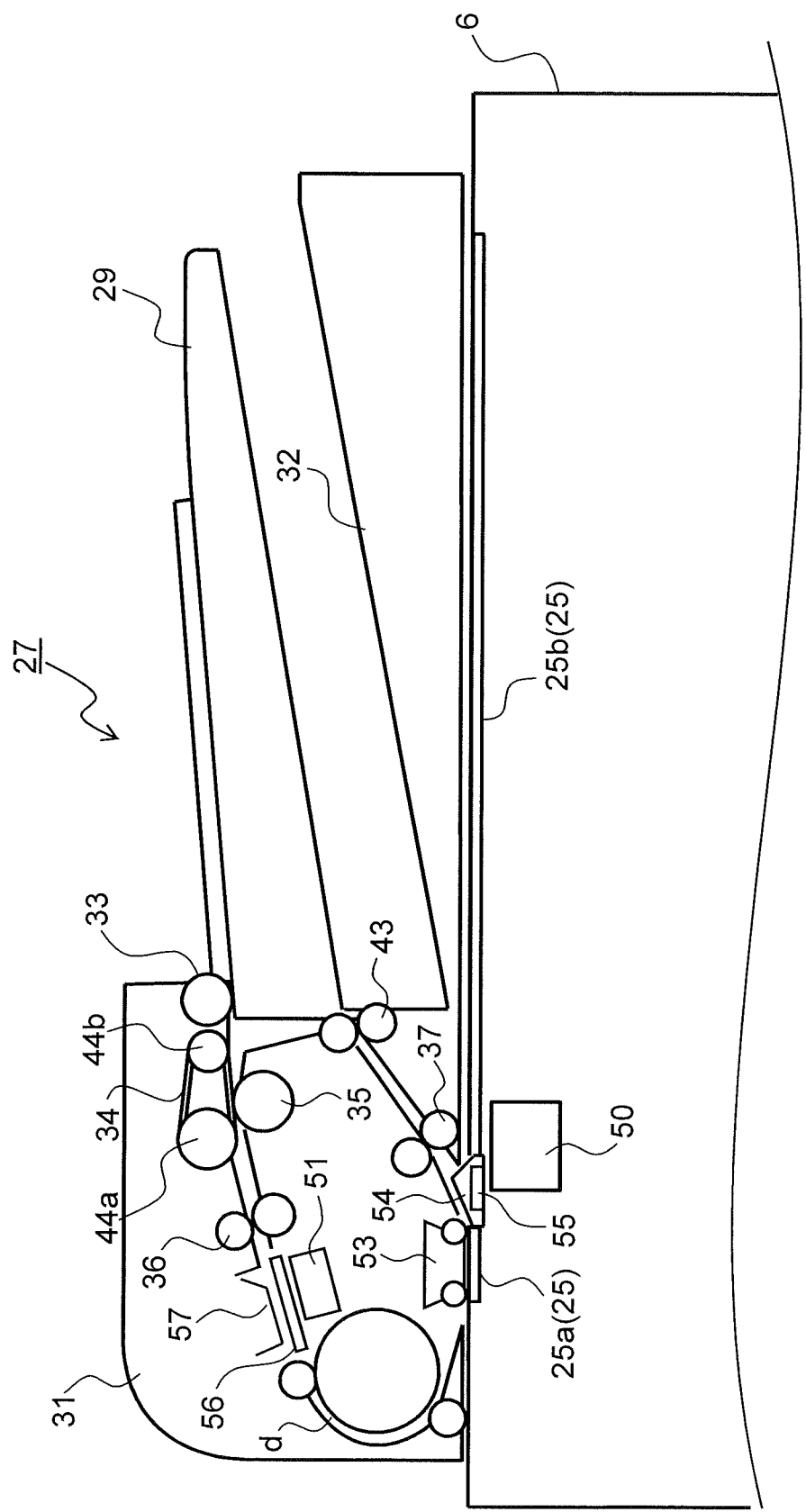
FIG. 2 is a side sectional view showing the internal structure of an image reading portion according to a first embodiment of the present disclosure and a document conveying device that automatically conveys a document to the image reading portion.

FIG. 2 is a side sectional view showing the internal structure of the image reading portion 6 according to a first embodiment of the present disclosure and the document conveying device 27 that automatically conveys a document to the image reading portion 6. On the top face of the image reading portion 6, there is arranged the contact glass 25 comprising an automatic reading glass 25a and a manual placement document glass 25b. Inside the image reading portion 6, an obverse side reading module 50 is arranged. The obverse side reading module 50 moves in the sub scanning direction (left-right direction in FIG. 2) and meanwhile reads the image of a document placed on the manual placement document glass 25b. The obverse side reading module 50, while staying right under the automatic reading glass 25a, reads an image on the obverse side (lower side) of a document conveyed by the document conveying device 27.

Between the automatic reading glass 25a and the manual placement document glass 25b, there is arranged a conveying guide 54 that scoops up the leading edge of the document conveyed by the document conveying device 27. At the bottom of the conveying guide 54, there is arranged an obverse side white reference plate 55 for shading correction in the obverse side reading module 50.

Inside a cover member 31 of the document conveying device 27, there is formed a document conveying passage d extending from a document feeding tray 29 to a document discharge tray 32. Along the document conveying passage d, there are provided document conveying members comprising a pick-up roller 33, a sheet feeding belt 34, a separation roller 35, a registration roller pair 36, a conveying roller pair 37, a discharge roller pair 43, and the like, and a reverse side reading module 51 that reads an image on the reverse side of a document. Adjacent to the reverse side reading module 51, a reverse side reading glass 56 is arranged. The reverse side reading glass 56 constitutes a part of the inner wall face of the document conveying passage d. In a position facing the reverse side reading glass 56 across the document conveying passage d, there is arranged a reverse side white reference plate 57 for shading correction in the reverse side reading module 51.

The sheet feeding belt 34 is stretched around a driving roller 44a and a driven roller 44b and is in pressed contact with the separation roller 35 with a predetermined pressure from below. The separation roller 35 incorporates a torque limiter, and only when the rotation load surpasses a predetermined torque, it rotates by following the sheet feeding belt 34.

The document conveying path d is curved so as to reverse while leading from the registration roller pair 36 to the automatic reading glass 25a. In the document conveying path d, there are provided at adequate places a plurality of document detecting sensors (unillustrated) including a sheet feeding sensor and a discharge sensor for detecting the presence or passage of a document.

Next, document conveying operation by a sheet-through method using the document conveying device 27 will be described. In the sheet-through method, a document comprising a plurality of sheets is set, with the image face up, on the document feeding tray 29. Then, when a copy start button in an operating portion 80 (see FIG. 5) of the image forming apparatus 100 is switched on, a lift plate (unillustrated) raised by a lift mechanism (unillustrated) pushes the pick-up roller 33 up via a document. As a result, the weight of a frame body (unillustrated) including the pick-up roller 33 acts on the lift plate and thereby the top face of the document is pressed against the pick-up roller 33 with a predetermined pressure (sheet feeding pressure).

Here, the pick-up roller 33, the driving roller 44a, the driven roller 44b and the sheet feeding belt 34 are arranged on an unillustrated frame body. The pick-up roller 33 is coupled to the driving roller 44a by an unillustrated gear. When a roller driving motor (unillustrated) rotates the driving roller 44a, the sheet feeding belt 34 that is stretched around the driving roller 44a and the driven roller 44b is driven to rotate, and the pick-up roller 33 is also driven to rotate.

From the document that is set on the document feeding tray 29, generally a plurality of sheets at the top are fed by the pick-up roller 33 to the nip portion between the sheet feeding belt 34 and the separation roller 35. Then, the separation roller 35 separates only the one topmost sheet from the document comprising a plurality of sheets to convey it toward the registration roller pair 36. Here, after the leading edge of the document is detected by the sheet feeding sensor, the document is conveyed across a predetermined distance. Then the roller driving motor stops so that the pick-up roller 33 and the sheet feeding belt 34 stop being driven to rotate, and thus primary sheet feeding is finished. The primarily fed document, with a sag formed in it, has its leading edge stopped by the nip portion of the registration roller pair 36.

When a predetermined time has passed after the completion of primary sheet feeding, secondary sheet feeding is started. That is, with operation of the secondary sheet feeding motor (unillustrated), the registration roller pair 36 is driven to rotate. The document is conveyed toward the automatic reading glass 25a by the registration roller pair 36 and the conveying roller pair 37. The document conveyed to the automatic reading glass 25a touches a document holding member 53 arranged opposite the automatic reading glass 25a, and is thereby pressed against the automatic reading glass 25a from above. The image on the obverse side (automatic reading glass 25a side) of the document is, through the automatic reading glass 25a, read by the obverse side reading module 50.

The document that has passed the automatic reading glass 25a is, via the conveying guide 54, conveyed toward the conveying roller pair 37 and the discharge roller pair 43, and is finally discharged on the document discharge tray 32 by the discharge roller pair 43. At this time, when the discharge sensor detects the passage of the trailing edge of the document, completion of image reading for one document is detected. Here, the discharge sensor has a counting function for counting the number of documents each time conveyance of a document is complete, and if the sheet feeding sensor detects the following document, the conveyance of the second and the subsequent documents is continued in the same way as described above.

When a double sided document is read, the image on the reverse side of the document is read by the reverse side reading module 51 provided on the upstream side of the document holding member 53, and then the image on the obverse side of the document is read by the obverse side reading module 50.

Figure 3:
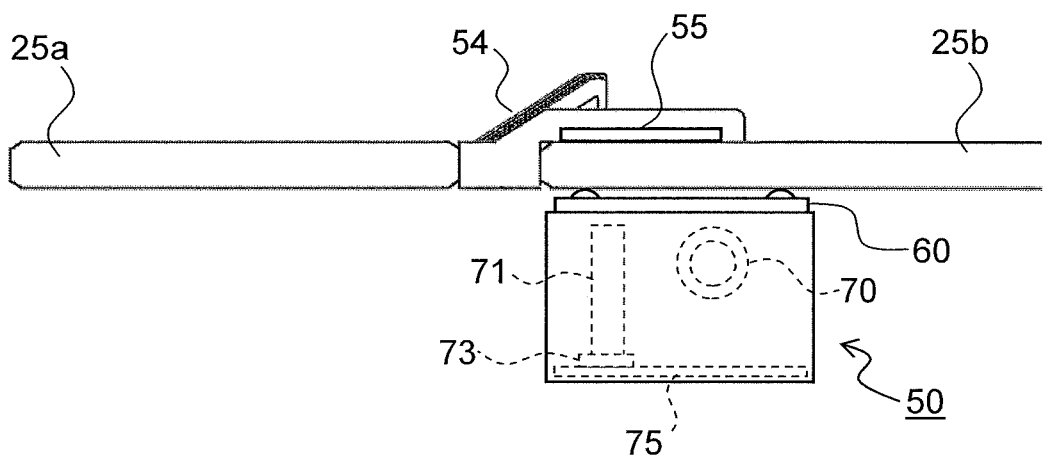
FIG. 3 is an enlarged view of and around an obverse side reading module in FIG. 2 showing a state where the obverse side reading module is arranged at a reference position.
Figure 4:
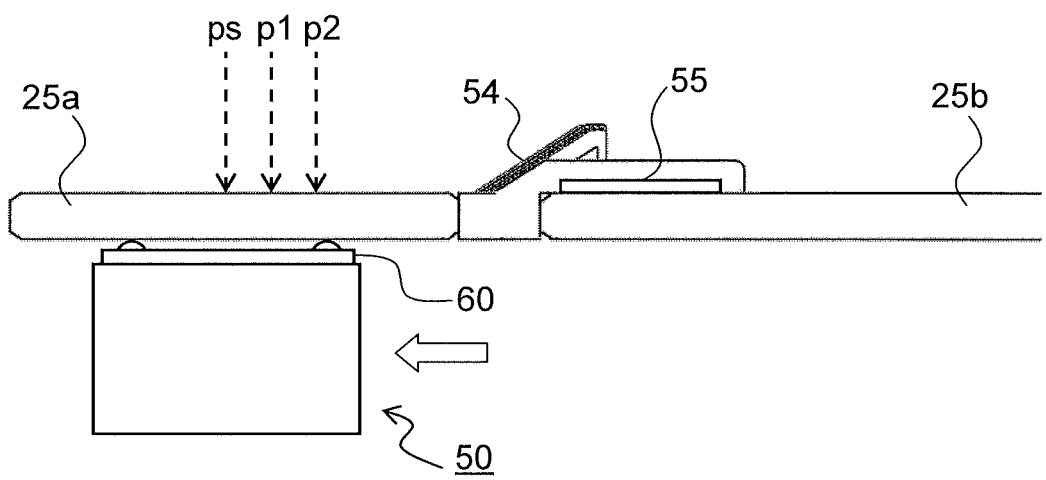
FIG. 4 is an enlarged view of and around the obverse side reading module in FIG. 2 showing a state where the obverse side reading module is arranged at the image reading position.

FIGS. 3 and 4 are enlarged views of and around the obverse side reading module 50 and the obverse side white reference plate 55 in FIG. 2, respectively showing a state where the obverse side reading module 50 is at a reference position (home position) and a state where the obverse side reading module 50 is at an image reading position. As shown in FIG. 3, the obverse side reading module 50 is a reading module of a type using a CIS (contact image sensor) system, inside which is provided with a light source 70, a condenser lens 71 comprising a plurality of lenses, and a CMOS (complementary MOS) sensor 73 as a reading means. The light shone from the light source 70 is reflected by a document (unillustrated), and then is converged by the condenser lens 71 to be led to the CMOS sensor 73. The CMOS sensor 73 is supported on a substrate 75. The obverse side reading module 50 touches the reverse side of the contact glass 25 via a slider 60.

Although in the example under discussion the obverse side reading module 50 adopts a reading method using a unity-magnification optical system that employs the CMOS sensor 73 as an image sensor without using a mirror, it is also possible to use a reduction optical system that employs a plurality of mirrors and optical lenses combined with what is called a CCD (charge-coupled device) as an image sensor and that reads a reduced image imaged through the optical lenses.

In the above configuration, to read a document image by a fixed-document method, a document (unillustrated) is first placed on the manual placement document glass 25b with its obverse side down. Then, while the image face of the document is irradiated with the light from the light source 70, the obverse side reading module 50 is moved from the scanner home side (the left side of FIG. 2) to the scanner return side (the right side of FIG. 2) at a predetermined speed. As a result, the light reflected on the image face is focused, as image light, on the CMOS sensor 73. The focused image light is broken down into pixels in the CMOS sensor 73, and is converted into an electric signal reflecting the density of the individual pixels, and thus an image is read.

On the other hand, if an image is read through the sheet-through method, as shown in FIG. 4, the obverse side reading module 50 is moved to right under the automatic reading glass 25a. The documents are sequentially conveyed by the document conveying device 27 toward the automatic reading glass 25a, and while being lightly pressed by the document holding member 53, the documents pass across the automatic reading glass 25a. Here, the obverse side of the document is irradiated with the light from the light source 70 and the image light reflected on the image face is focused on the CMOS sensor 73, and thus an image is read. In either reading method, an image signal read by the obverse side reading module 50 is converted into a digital signal, and is then sent out to a temporary storage portion 94 (see FIG. 5).

Figure 5:
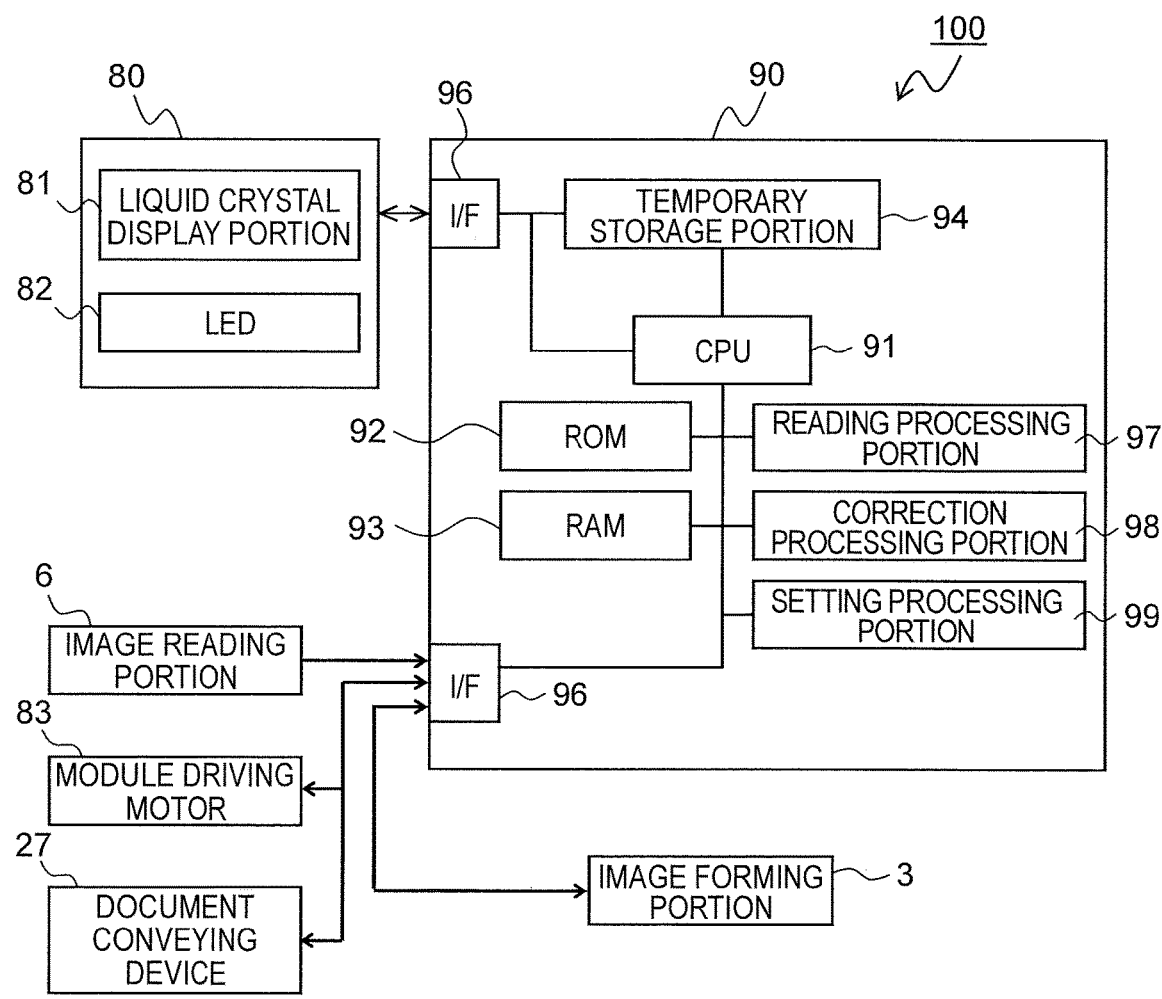
FIG. 5 is a block diagram showing one example of control paths used in the image forming apparatus of the first embodiment.

FIG. 5 is a block diagram showing one example of control paths used in the image forming apparatus 100 of this embodiment. When the image forming apparatus 100 is used, different parts of the image forming apparatus 100 are controlled in different manners, and thus the control paths in the whole image forming apparatus 100 are complicated. Thus, the following description focuses on those control paths which are essential for the implementation of the present disclosure.

The operating portion 80 has a liquid crystal display portion 81 and an LED 82 that shows different statuses, and is configured to display the status of the image forming apparatus 100, the status of image formation, the number of copies, and so on. Various settings of the image forming apparatus 100 are made via a printer driver on a computer.

In the operating portion 80, there are provided, among others, a start button operated by a user to instruct to start image formation, a stop/clear button used, for example, to stop image formation, and a reset button used to bring the different settings in the image forming apparatus 100 back to default states.

A module driving motor 83, when a document image is read by the fixed-document method, reciprocates the obverse side reading module 50 in the sub scanning direction (the left-right direction in FIG. 2). The module driving motor 83, when a document image is read through the sheet-through method, moves the obverse side reading module 50 to a reference reading position ps and to a first reading portion p1, a second reading position p2 . . . deviated from the reference reading position ps in the sub scanning direction, which will be described later. The module driving motor 83 is a stepping motor, and the control portion 90 can detect the image reading position of the obverse side reading module 50 based on the number of driving pulses in the module driving motor 83.

The control portion 90 is provided at least with a CPU (central processing unit) 91, a ROM (read only memory) 92 that is a read-only storage portion, a RAM (random access memory) 93 that is a readable-writable storage portion, the temporary storage portion 94 that temporarily stores image data and the like, a plurality (here, two) of I/Fs (interfaces) 96 that send control signals to different devices in the image forming apparatus 100 and receives input signals from the operating portion 80, a reading processing portion 97, a correction processing portion 98, and a setting processing portion 99. The control portion 90 can be arranged at any place inside the image forming apparatus 100.

The control portion 90 transmits control signals to different parts and devices in the image forming apparatus 100 from the CPU 91 through the I/F 96. From the different parts and devices, input signals and signals that indicate their statuses are transmitted through the I/F 96 to the CPU 91. The different parts and devices controlled by the control portion 90 include, for example, the image forming portion 3, the image reading portion 6, the document conveying device 27, and the operating portion 80.

The ROM 92 stores data and the like that are not changed during the use of the image forming apparatus 100, such as a control program for the image forming apparatus 100 and values needed for control. The RAM 93 stores necessary data generated while the image forming apparatus 100 is controlled, data temporarily needed to control the image forming apparatus 100, and the like. The RAM 93 (or ROM 92) stores a first adjustment value Rf acquired for shading correction, which will be described later, a second adjustment value Rs, a correction coefficient needed to calculate second adjustment value Rsn for each image reading position, and the like. The temporary storage portion 94 temporarily stores an image signal that is input from an image input portion (unillustrated) for receiving image data sent from the image reading portion 6 and that is then converted into a digital signal.

The reading processing portion 97 performs fixed-reading processing in which image data is read, using the obverse side reading module 50, from a document placed on the manual placement document glass 25b. The reading processing portion 97 performs conveyed-reading processing in which image data is read, using the obverse side reading module 50, from a document conveyed by the document conveying device 27 to the automatic reading glass 25a.

The correction processing portion 98 performs, according to formula (1) shown below, shading correction for each pixel of the image data read through fixed-reading processing and conveyed-reading processing.

$$D\text{out}=A \times R \times (D\text{in}-Db)/(Dw-Db) \qquad (1)$$

In formula (1), Din represents the density value of the image data before correction, and Dout represents the density value of the image data after correction. A represents the number of gradations of the image data after correction, and R represents an adjustment value. For example, the number of gradations A is 256. Dw is white reference data and shows the output level of the CMOS sensor 73 when the obverse side reading module 50 is arranged at the home position and the light source 70 is turned on so that the light shone from the light source 70 is reflected on the obverse side white reference plate 55 and is then converged by the condenser lens 71 to be led to the CMOS sensor 73. Db is black reference data and represents the output level of the CMOS sensor 73 when the light source 70 is turned off.

When the adjustment value R used for shading correction in fixed-reading processing and the adjustment value R used for shading correction in conveyed-reading processing are set at the same value, if a document conveyed from the document conveying device 27 by a sheet-through method can be read while it is in close contact with the automatic reading glass 25a, an image read through conveyed-reading processing has the same density as an image read through fixed-reading processing.

However, in the sheet-through method, a document is read while being conveyed through a gap between the automatic reading glass 25a and the document holding member 53, and after its leading edge is picked up by the conveying guide 54, the document is conveyed to the document discharge tray 32. Thus, in conveyed-reading processing, a document can be read while it is not in close contact with the automatic reading glass 25a, and thus the irradiation distance and the irradiation angle of the light from the light source 70 to the document changes. As a result, in conveyed-reading processing, the amount of the reflected light from the document is smaller, causing the phenomenon of higher image density than in fixed-reading processing.

Thus, in this embodiment, by reading a reference image by the fixed-document method and the sheet-through method, the first adjustment value Rf used for shading correction in fixed-reading processing and the second adjustment value Rs used for shading correction in conveyed-reading processing are acquired respectively. Considering that image density becomes higher in conveyed-reading processing than in fixed-reading processing, the second adjustment value Rs is set higher than the first adjustment value Rf so that the document can be read with a density equivalent to that in fixed-reading processing.

The correction processing portion 98 performs shading correction on image data read through fixed-reading processing by the reading processing portion 97 using the first adjustment value Rf. The correction processing portion 98 performs shading correction on image data read through conveyed-reading processing by the reading processing portion 97 using the second adjustment value Rs. The first adjustment value Rf and the second adjustment value Rs are stored in the ROM 92 (or the RAM 93).

The setting processing portion 99 sets adjustment values used for shading correction when a document is read using the obverse side reading module 50 through fixed-reading processing or conveyed-reading processing. Now, the method for setting the first adjustment value Rf and the second adjustment value Rs in the image reading portion 6 of this embodiment will be described below.

To acquire the first adjustment value Rf used for shading correction in fixed-reading processing, image data is read from a reference sheet with a predetermined reference image (a white image) on it that is placed on the manual placement document glass 25*b* using the obverse side reading module 50. The setting processing portion 99 acquires the first adjustment value Rf based on the image data (reference image data) of the read reference sheet.

Specifically, suppose that the target value of the image density of the reference image is 100, and that the image density of the reference image when a document is actually placed on the manual placement document glass 25*b* and is read through fixed-reading processing is 90. Here, the setting processing portion 99 sets the first adjustment value Rf such that 100/90≈1.1 to make the image density of the read reference image equal to the target value (100). The set first adjustment value Rf is stored in the RAM 93.

Similarly, to acquire the second adjustment value Rs used for shading correction in conveyed-reading processing, the reference sheet with the reference image on it that is conveyed to the automatic reading glass 25*a* by the document conveying device 27 is read using the obverse side reading module 50. Then, if the image density of the read reference image is 80, the setting processing portion 99 sets the second adjustment value Rs such that 100/80≈1.25 to make the image density of the read reference image equal to the target value (100). The set second adjustment value Rs is stored in the RAM 93.

In conveyed-reading processing, an image is read while the obverse side reading module 50 stays at a predetermined image reading position (the reference reading position ps in FIG. 4). This is susceptible to a problem: if foreign matter such as paper dust attaches to the reference reading position ps on the automatic reading glass 25*a*, streaks may appear on the image. Such influence of foreign matter can be reduced by means such as providing image reading positions in conveyed-reading processing at a plurality of places in the sub scanning direction (the left-right direction in FIG. 4) and moving the obverse side reading module 50 to each image reading position. For example, the obverse side reading module 50 can be moved to the first reading portion p1, to the second reading position p2 . . . that deviate from the reference reading position ps shown in FIG. 4 in the sub scanning direction.

Here, if a plurality of image reading positions in conveyed-reading processing are provided, at each image reading position, the distance between a document and the light source 70 as well as the relationship of the irradiation angle of the light from the light source 70 to a document change. Thus, different second adjustment values Rs are set for the different image reading positions so that a document can be read with an adequate image density at all the image reading positions.

However, conveying the reference sheet to and reading it through conveyed-reading processing at all the image reading positions to acquire the second adjustment value Rs results in a longer time being required to acquire the second adjustment value Rs and an increase in the number of pieces of data to be stored. To avoid that, the reference reading position ps in conveyed-reading processing is set and the relationship between the image density in fixed-reading processing and the image density in conveyed-reading processing at each image reading position (ps, p1, p2 . . . ) is grasped in advance; then the correction coefficient of the second adjustment value Rs at each image reading position is so set as to yield an image density equivalent to that in fixed-reading processing. That is, in conveyed-reading processing, the reference sheet is read only at the reference reading position ps to set the second adjustment value Rs.

Here, shading correction in conveyed-reading processing is performed using the image density in fixed-reading processing as a reference, and so the first adjustment value Rf used for shading correction in fixed-reading processing is used as a reference adjustment value. Thus, if the second adjustment value Rs (the reference second adjustment value) at the reference reading position ps in conveyed-reading processing is represented by Rs0, the second adjustment value Rs0 is given by the following formula (2).

$$Rs0 = Rf \times k0 \qquad (2)$$

In formula (2), k0 is the correction coefficient for the reference reading position ps in conveyed-reading processing.

On the other hand, if the second adjustment value Rs at the nth reference reading position pn from the reference reading position ps is represented by Rsn, the second adjustment value Rsn is given by the following formula (3).

$$Rsn = Rs0 \times kn/k0 \qquad (3)$$

In formula (3), kn is the correction coefficient for the nth reference reading position pn.

Further, an initial value Rini that makes the image density obtained when the obverse side white reference plate 55 is read by the obverse side reading module 50 equal to the target value (for example, 100) is stored in the ROM 92 (or RAM 93) in advance.

In some cases, in the image forming apparatus 100, part or all of the adjustment values used in shading correction may be left unset. For example, in the image forming apparatus 100, a circuit board including the ROM 92 or the RAM 93 that stores the first adjustment value Rf and the second adjustment value Rs for fixed-reading processing and conveyed-reading processing respectively may fail and be replaced. In that case, a user or a service person needs to make the image forming apparatus 100 read the image data on the reference sheet for both of the reading methods and set anew the first adjustment value Rf and the second adjustment value Rs for each reading method.

Here, if a user or the like fails to perform the task, part or all of the adjustment values for each reading method is left unset. As a result, if conveyed-reading processing is performed by the sheet-through method with, for example, the second adjustment value Rs unset, an inconvenience of a high density of the read image occurs. Also, making the image forming apparatus 100 read the reference sheet to re-set the second adjustment value Rs results in a longer waiting time for image reading processing.

Thus, in this embodiment, if the second adjustment value Rs is not set and the first adjustment value Rf is set, the second adjustment value Rs is set based on the first adjustment value Rf. Also, if neither of the first adjustment value Rf and the second adjustment value Rs are set, the second adjustment value Rs is set based on the initial value Rini.

Figure 6:
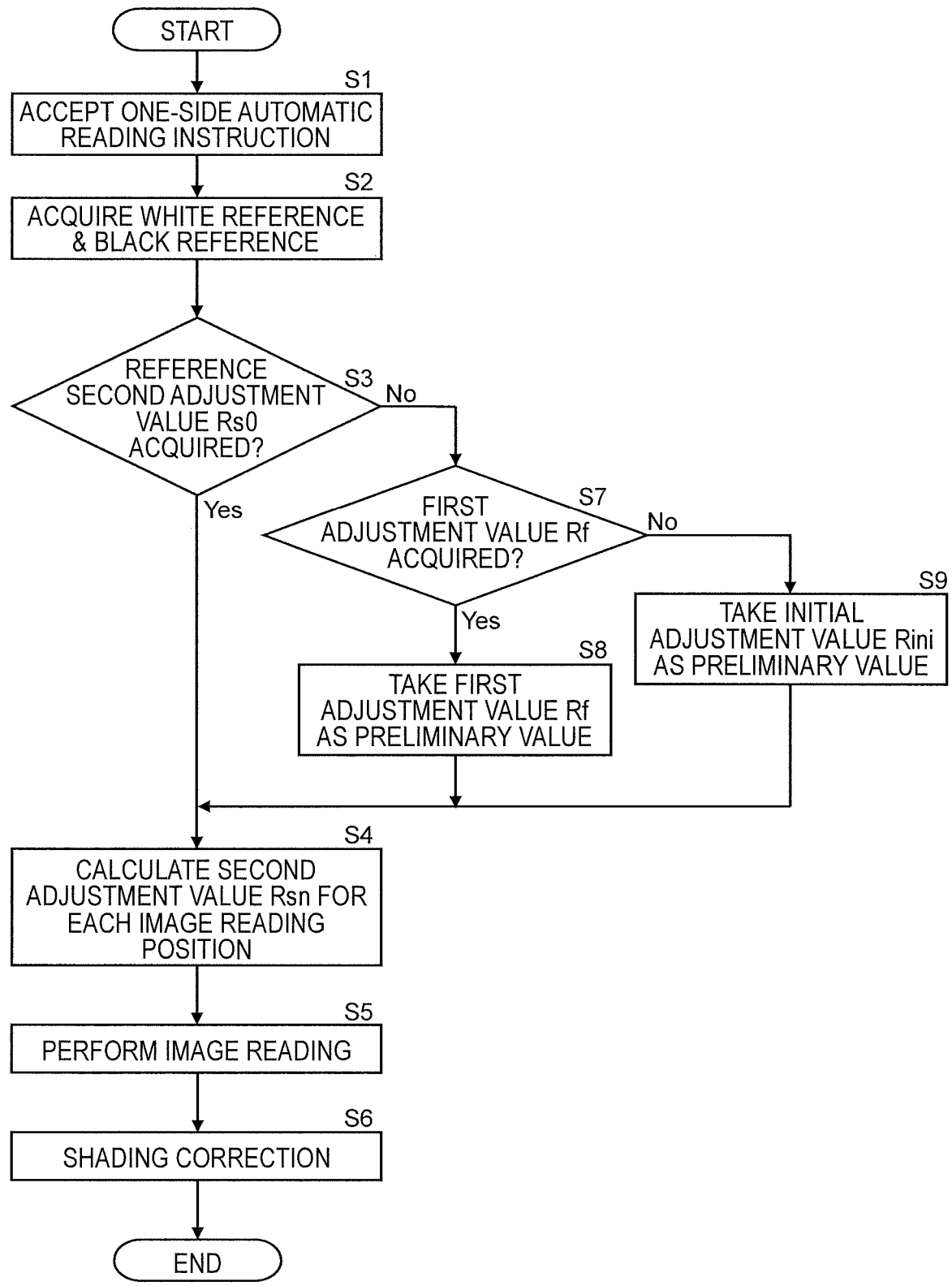
FIG. 6 is a flow chart showing a configuration example in a case where a one-side document is continuously read by the sheet-through method in the image reading portion of the first embodiment.

FIG. 6 is a flow chart showing an example of control in a case where a one-side document is read by the sheet-through method in the image reading portion 6 of this embodiment. With reference also to FIGS. 1 to 5 as necessary, the procedure for reading a one-side document by the sheet-through method will be described along the steps in FIG. 6.

When an instruction to perform one-side automatic reading by the sheet-through method is input (step S1), the control portion 90 first acquires white reference data and black reference data used for shading correction (step S2). Specifically, as shown in FIG. 3, the control portion 90 acquires as white reference data DW (white reference acquisition) the output level of the CMOS sensor 73 when the obverse side reading module 50 is arranged at the home position and the light source 70 is turned on so that the light shone from the light source 70 is reflected on the obverse side white reference plate 55 and is then converged by the condenser lens 71 to be led to the CMOS sensor 73. The control portion 90 also acquires as black reference data Db (black reference acquisition) the output level of the CMOS sensor 73 when the light source 70 is turned off.

When white reference data is acquired, it is preferable to sample white reference data across a plurality of lines in the main scanning direction (direction perpendicular to the plane of FIG. 3) on the obverse side white reference plate 55 while the obverse side reading module 50 is moved to the upstream side (the leftward direction in FIG. 3) in the document conveying direction to average the acquired white reference data. In this way, the influence of black spots or dust on the obverse side white reference plate 55 can be eliminated.

Next, the control portion 90 checks whether the second adjustment value Rs has been acquired (step S3). As described above, the second adjustment value Rsn at each reading position psn is calculated based on the second adjustment value Rs0 at the reference reading position ps, and thus the second adjustment value Rs mentioned above refers to the second adjustment value Rs0 (reference second adjustment value) at the reference reading position ps.

If the second adjustment value Rs (Rs0) has already been acquired (Yes in step S3), the control portion 90 sets the second adjustment value Rsn with the setting processing portion 99 for each image reading position in the obverse side reading module 50 (step S4). Specifically, the control portion 90 calculates according to formula (3) given above the second adjustment value Rsn for each image reading position. For example, if the image reading position is the reference reading position ps, Rs0=Rs×k0/k0=Rs, and so the set second adjustment value Rs is as it is taken as the second adjustment value Rs0. If the image reading position is the first reading position p1, the second adjustment value Rs1 is calculated according to Rs1=Rs×k1/k0.

Next, the control portion 90 starts conveyance of a document by the document conveying device 27, and moves the obverse side reading module 50 to the image reading position (see FIG. 4) to perform image reading (step S5). The control portion 90 performs shading correction on the image data of the document read through conveyed-reading processing performed in step S5 (step S6). Specifically, using the white reference data Dw and the black reference data Db acquired in step S2 as well as the second adjustment value Rsn for each image reading position calculated in step S4, shading correction is performed according to formula (1).

On the other hand, if, in step S3, the second adjustment value Rs (Rs0) is not acquired (No in step S3), the control portion 90 checks whether the first adjustment value Rf has already been acquired (step S7). If the first adjustment value Rf has already been acquired (Yes in step S7), the setting processing portion 99 sets the first adjustment value Rf at a preliminary adjustment value for shading correction (step S8). If, in step S7, the first adjustment value Rf is not acquired (No in step S7), the setting processing portion 99 takes the initial value Rini as a preliminary adjustment value for shading correction (step S9).

Next, the control portion 90 sets the second adjustment value Rsn for each image reading position in the obverse side reading module 50 (step S4). Specifically, if the first adjustment value Rf is taken as the preliminary adjustment value, the second adjustment value Rsn is calculated according to the following formula (4) derived from formulae (2) and (3).

$$Rsn = Rf \times kn \quad (4)$$

For example, if the image reading position is the reference reading position ps, the second adjustment value Rs0 is calculated according to Rs0=Rf×k0. If the image reading position is the first reading position p1, the second adjustment value Rs1 is calculated according to Rs1=Rf×k1.

If the initial value Rini is taken as the preliminary adjustment value, the second adjustment value Rsn is calculated according to the following formula (5).

$$Rsn = Rini \times kn \quad (5)$$

For example, if the image reading position is the reference reading position ps, the second adjustment value Rs0 is calculated according to Rs0=Rini×k0. If the image reading position is the first reading position p1, the second adjustment value Rs1 is calculated according to Rs1=Rini×k1.

Then, image reading is performed (step S6), and then, using the white reference data Dw and the black reference data Db acquired in step S2 as well as the second adjustment value Rsn calculated in step S4, shading correction is performed according to formula (1) (step S7). Then, based on the image data after shading correction, printing processing is performed in the image forming portion 3.

As explained above, in the image reading portion 6 of this embodiment, during one-side (obverse side) continuous reading by the sheet-through method, if the second adjustment value Rs for conveyed-reading processing is not acquired and the first adjustment value Rf for fixed-reading processing is acquired, the first adjustment value Rf for fixed-reading processing is taken as a preliminary adjustment value. If neither of the second adjustment value Rs and the first adjustment value Rf are set, the initial value Rini is taken as a preliminary adjustment value. Then, using the set first adjustment value Rf or the initial value Rini, the second adjustment value Rsn is calculated for each image reading position. With this, conveyed-reading processing can be performed without re-acquiring the second adjustment value Rs through conveyance and reading of reference sheet, and this makes it possible to increase productivity (reading efficiency) while ensuring as high image quality as possible.

Moreover, there is no need to convey the reference sheet for each image reading position to acquire the second adjustment value Rsn nor to hold a plurality of second adjustment values Rsn as data. Thus, it is possible, while reducing the time required to set the second adjustment value Rs and the amount of data to be held, to suppress unevenness of density in the read image caused by a change in the reading position.

Although FIG. 6 shows an example of control when one-side document is read using the obverse side reading module 50, the present disclosure is also applicable similarly to control when, in double-sided document reading by the sheet-through method, the obverse side of the document is read using the obverse side reading module 50.

Figure 7:
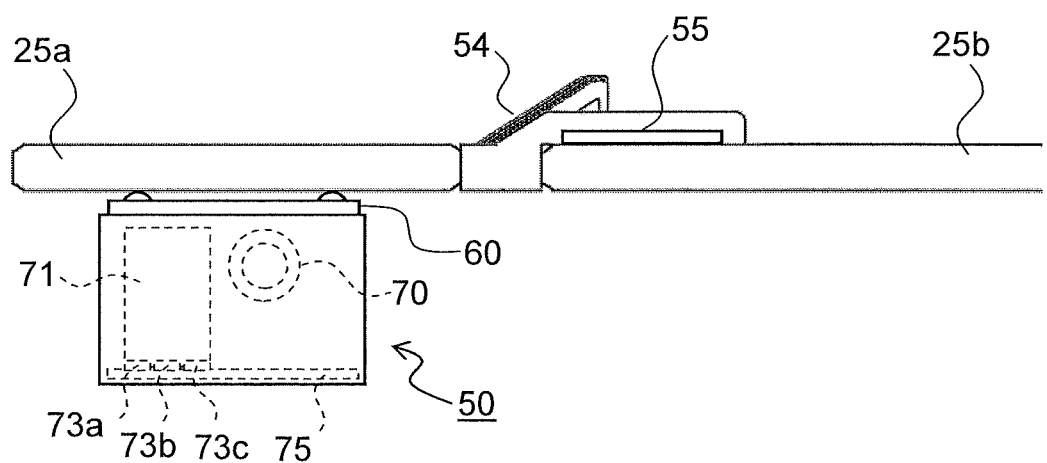
FIG. 7 is a side sectional view of and around an obverse side reading module used in an image reading portion according to a second embodiment of the present disclosure.
Figure 8:
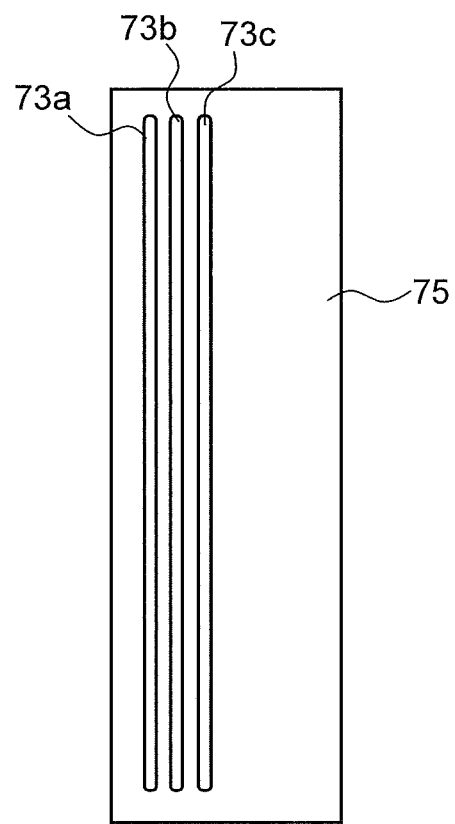
FIG. 8 is a plan view of a substrate of the obverse side reading module used in the image reading portion in the second embodiment as seen from above.

FIG. 7 is a side cross-sectional view of and around an obverse side reading module 50 used in an image reading portion 6 according to a second embodiment of the present disclosure. FIG. 8 is a plan view of a substrate 75 of an obverse side reading module 50 used in an image reading portion 6 of the second embodiment as seen from above. In this embodiment, as a CMOS sensor 73 incorporated in the obverse side reading module 50, a plurality (here, three) of the CMOS sensors 73a to 73c are used for each of three reading colors of R (red), G (green) and B (blue) to read the reflected light (image light) from a document. In other respects, the obverse side reading module 50 here is configured similarly to that in the first embodiment.

As in this embodiment, when a plurality (here, three) of CMOS sensors 73a to 73c are used for different reading colors respectively, as shown in FIG. 8, each CMOS sensor 73 is arranged at a different position in the sub scanning direction (the left-right direction in FIG. 8). Thus, the incidence angle of the reflected light from a document to the CMOS sensors 73a to 73c varies. Accordingly, the second adjustment value Rsn needs to be individually set for each of the CMOS sensors 73a to 73c, and the correction coefficient kn also needs to be individually set for each of the CMOS sensors 73a to 73c.

The embodiments described above are in no way meant to limit the present disclosure, which thus allows for many modifications and variations within the spirit of the present disclosure. For example, although the embodiments described above deals with an image reading portion 6 incorporated as an image reading device in an image forming apparatus 100, the present disclosure is also applicable similarly to image scanners used separately from an image forming apparatus 100.

The present disclosure is applicable to image reading apparatuses that can read a document by a sheet-through method and a fixed-document method and that can, when reading an image by the sheet-through method, read at a plurality of image reading positions including a reference reading position. Based on the present disclosure, it is possible to provide an image reading device in which an adjustment value for shading correction at each image reading position can be quickly and easily set, as well as an image forming apparatus provided with such an image reading device.

What is claimed is:

1. An image reading device, comprising:
a contact glass which is fixed on a top face of a scanner frame and which is partitioned into a manual placement document class and an automatic reading glass:
a document conveying device which is supported openably and closably in an up-down direction with respect to the contact glass and which conveys a document to a tor face of the automatic reading glass;
a reading module including a light source which irradiates the document with light and a plurality of sensors which read light reflected from the document as image light, the reading module being arranged below the contact glass so as to be reciprocatable in a sub scanning, direction and which is configured to read image data of the document by a fixed-document method where an image of the document placed on the manual placement document glass is read while the reading module moves in the sub scanning direction and by a sheet-through method where the image of the document conveyed on the top face of the automatic reading glass by the document conveying device is read while the reading module stays at an image reading position facing the automatic reading glass:
a white referenced late arranged on the top face of the contact glass; and
a control portion, comprising at least one processor, which controls reading operation by the reading module, wherein
the control portion arranges the reading module so as to face the white reference plate and acquires white reference data and black reference data from an output level of the sensor as observed when the light source is turned on and turned off, the control portion including
a reading processing portion which is configured to perform fixed-reading processing where the image data is read by the fixed-document method using the reading module and conveyed-reading processing where the image data is read by the sheet-through method using the reading module,
a setting processing portion which acquires a first adjustment value based on data of a reference image acquired through the fixed-reading processing and which acquires a second adjustment value based on data of the reference image acquired through the conveyed-reading processing in the reading processing portion, and
a correction processing portion which performs shading correction using the white reference data, the black reference data and the first adjustment value on the image data read through the fixed-reading processing and which performs the shading correction using the white reference data, the black reference data and the second adjustment value on the image data read through the conveyed-reading processing,
the conveyed-reading processing can be performed while the reading module is kept staying at any of a plurality of the image reading positions including a reference reading position, the setting processing portion when a reference second adjustment value which is the second adjustment value at the reference reading position is acquired, calculates the second adjustment values for the plurality of image reading positions based on the reference second adjustment value, and when the reference second adjustment value is not acquired and the first adjustment value is acquired calculates the second adjustment values for the plurality of image reading positions based on the first adjustment value and
the setting processing portion, when the reference second adjustment value is acquired, multiplies a correction coefficient of the image reading position at which the conveyed-reading processing is performed with the reference second adjustment value and divide it with the correction coefficient of the reference reading position, thereby to calculate the second adjustment value for the image reading position at which the conveyed-reading processing is performed.

2. The image reading device according to claim 1, wherein
the reading module has a light source which irradiates the document with light and a plurality of sensors which respectively read different colors in reflected light of the light shone from the light source to the document, and
the setting processing portion calculates the second adjustment value individually using the different correction coefficient for each of the plurality of sensors.

3. The image reading device according to claim 1, wherein
the reading module is a contact image sensor.

4. An image forming apparatus, comprising:
the image reading device according to claim 1; and
an image forming portion which forms an image read by the image reading device on a sheet.

5. An image reading device, comprising:
a contact glass which is fixed on a top face of a scanner frame and which is partitioned into a manual placement document class and an automatic reading glass:
a document conveying device which is supported openably and closably in an up-down direction with respect to the contact glass and which conveys a document to a tor face of the automatic reading glass;
a reading module including a light source which irradiates the document with light and a plurality of sensors which read light reflected from the document as image light, the reading module being arranged below the contact glass so as to be reciprocatable in a sub scanning, direction and which is configured to read image data of the document by a fixed-document method where an image of the document placed on the manual placement document glass is read while the reading module moves in the sub scanning direction and by a sheet-through method where the image of the document conveyed on the top face of the automatic reading glass by the document conveying device is read while the reading module stays at an image reading position facing the automatic reading glass:
a white referenced late arranged on the top face of the contact glass; and
a control portion, comprising at least one processor, which controls reading operation by the reading module, wherein
the control portion arranges the reading module so as to face the white reference plate and acquires white reference data and black reference data from an output level of the sensor as observed when the light source is turned on and turned off, the control portion including
a reading processing portion which is configured to perform fixed-reading processing where the image data is read by the fixed-document method using the reading module and conveyed-reading processing where the image data is read by the sheet-through method using the reading module,
a setting processing portion which acquires a first adjustment value based on data of a reference image acquired through the fixed-reading processing and which acquires a second adjustment value based on data of the reference image acquired through the conveyed-reading processing in the reading processing portion, and
a correction processing portion which performs shading correction using the white reference data, the black reference data and the first adjustment value on the image data read through the fixed-reading processing and which performs the shading correction using the white reference data, the black reference data and the second adjustment value on the image data read through the conveyed-reading processing,
the conveyed-reading processing can be performed while the reading module is kept staying at any of a plurality of the image reading positions including a reference reading position, the setting processing portion when a reference second adjustment value which is the second adjustment value at the reference reading position is acquired, calculates the second adjustment values for the plurality of image reading positions based on the reference second adjustment value, and when the reference second adjustment value is not acquired and the first adjustment value is acquired calculates the second adjustment values for the plurality of image reading positions based on the first adjustment value and
the setting processing portion, when the reference second adjustment value is not acquired and the first adjustment value is acquired, takes the first adjustment value as a preliminary adjustment value for the shading correction and multiplies a correction coefficient of the image reading position at which the conveyed-reading processing is performed with the first adjustment value, thereby to calculate the second adjustment value for the image reading position at which the conveyed-reading processing is performed.

6. An image reading device, comprising:
a contact glass which is fixed on a top face of a scanner frame and which is partitioned into a manual placement document class and an automatic reading glass:
a document conveying device which is supported openably and closably in an up-down direction with respect to the contact glass and which conveys a document to a tor face of the automatic reading glass;
a reading module including a light source which irradiates the document with light and a plurality of sensors which read light reflected from the document as image light, the reading module being arranged below the contact glass so as to be reciprocatable in a sub scanning, direction and which is configured to read image data of the document by a fixed-document method where an image of the document placed on the manual placement document glass is read while the reading module moves in the sub scanning direction and by a sheet-through method where the image of the document conveyed on the top face of the automatic reading glass by the document conveying device is read while the reading module stays at an image reading position facing the automatic reading glass:
a white referenced late arranged on the top face of the contact glass; and
a control portion, comprising at least one processor, which controls reading operation by the reading module, wherein
the control portion arranges the reading module so as to face the white reference plate and acquires white reference data and black reference data from an output level of the sensor as observed when the light source is turned on and turned off, the control portion including
a reading processing portion which is configured to perform fixed-reading processing where the image data is read by the fixed-document method using the reading module and conveyed-reading processing where the image data is read by the sheet-through method using the reading module,
a setting processing portion which acquires a first adjustment value based on data of a reference image acquired through the fixed-reading processing and which acquires a second adjustment value based on data of the reference image acquired through the conveyed-reading processing in the reading processing portion, and a correction processing portion which performs shading correction using the white reference data, the black reference data and the first adjustment value on the image data read through the fixed-reading processing and which performs the shading correction using the white reference data, the black reference data and the second adjustment value on the image data read through the conveyed-reading processing, the conveyed-reading processing can be performed while the reading module is kept staying at any of a plurality of the image reading positions including a reference reading position, the setting processing portion when a reference second adjustment value which is the second adjustment value at the reference reading position is acquired, calculates the second adjustment values for the plurality of image reading positions based on the reference second adjustment value, and when the reference second adjustment value is not acquired and the first adjustment value is acquired calculates the second adjustment values for the plurality of image reading positions based on the first adjustment value and the setting processing portion, when neither of the reference second adjustment value nor the first adjustment value is acquired, takes a prescribed initial value as the preliminary adjustment value for the shading correction and multiplies the correction coefficient of the image reading position at which the conveyed-reading processing is performed with the initial value, thereby to calculate the second adjustment value for the image reading position at which the conveyed-document reading processing is performed.

7. An image reading method for use when performing, using an image reading device configured to read an image through fixed-reading processing in which an image data is read by a fixed-document method and through conveyed-reading processing in which the image data is read by a sheet-through method, the conveyed-reading processing at any of a plurality of image reading positions including a reference reading position, the method comprising:

a reference acquisition process in which white reference data and black reference data used for shading correction are acquired, an adjustment value calculation process for calculating a second adjustment value for the image reading position at which the conveyed-reading processing is performed including a first step in which a first adjustment value is acquired by reading a reference sheet including a prescribed reference image through the fixed-reading processing, a second step in which a reference second adjustment value is acquired by reading the reference sheet through the fixed-reading processing at the reference reading position, a third step in which, when the reference second adjustment value is acquired in the second step, the second adjustment values for the plurality of image reading positions are calculated based on the reference second adjustment value, a fourth step in which, when the reference second adjustment value is not acquired in the second step and first adjustment value is acquired in the first step, the second adjustment values for the plurality of image reading positions are calculated based on the first adjustment value, and a fifth step in which, when the reference second adjustment value is not set in the second step and the first adjustment value is not set in the first step, calculates the second adjustment values for the plurality of image reading positions based on a prescribed initial value, a document reading process for performing the conveyed-reading processing using the image reading device, and a correction process for performing the shading correction on image data read in the document reading process using the white reference data and the black reference data acquired in the reference acquisition process and the second adjustment value calculated in the adjustment value setting process.

* * * * *